United States Patent [19]

Asawa et al.

[11] 3,947,351

[45] Mar. 30, 1976

[54] ACID DIFFUSION-DIALYSIS PROCESS UTILIZING ANION EXCHANGE MEMBRANE OF 4-55 MICRON THICKNESS

[75] Inventors: Tatsuro Asawa; Tomoki Gunjima, both of Yokohama, Japan

[73] Assignee: Asahi Glass Company, Ltd., Tokyo, Japan

[22] Filed: May 24, 1973

[21] Appl. No.: 363,494

Related U.S. Application Data

[63] Continuation-in-part of Ser. No. 211,940, Dec. 22, 1971, abandoned.

[52] U.S. Cl. .......... 210/22 R; 210/37 R; 260/2.1 E; 260/878 R; 260/884
[51] Int. Cl.² C02B 1/56; C08F 255/02; B01D 13/00
[58] Field of Search ...................... 260/2.1 E; 210/22

[56] References Cited
UNITED STATES PATENTS

| | | | |
|---|---|---|---|
| 3,132,095 | 5/1964 | Wolf et al. | 260/2.1 E |
| 3,133,889 | 5/1964 | Hazenberg et al. | 260/2.1 E |
| 3,244,620 | 4/1966 | Hansen et al. | 210/22 |
| 3,247,133 | 4/1966 | Chen | 260/2.1 E |
| 3,298,969 | 1/1967 | D'Alelio | 260/2.1 E |
| 3,304,272 | 2/1967 | Zenftman | 260/2.1 E |
| 3,451,951 | 6/1969 | Mizutani et al. | 260/2.1 E |
| 3,472,918 | 10/1969 | Guillet | 260/878 |
| 3,562,139 | 2/1971 | Leitz | 260/2.1 E |

*Primary Examiner*—Melvin Goldstein
*Assistant Examiner*—Peter Kulkosky
*Attorney, Agent, or Firm*—Oblon, Fisher, Spivak, McClelland & Maier

[57] ABSTRACT

An acid diffusion-dialysis membrane, which can be used for separating an acid from a mixture of an acid and a salt, or a mixture of an acid and a water-soluble organic compound, e.g., glucose, by non-electrolytic dialysis, is prepared by forming a film from the combination of (I) a vinyl group containing benzene monomer or a vinyl group containing pyridine monomer, (II) a non-conjugated divinyl-containing monomer, and (III) a thermoplastic polymer which is swellable or soluble in the monomer mixture, polymerizing said monomer mixture in the film, and then introducing anion exchange groups into the resulting polymerized product. The acid diffusion-dialysis membrane is characterized by a high acid diffusion-dialysis coefficient and a high acid-salt selectivity ratio, and further by a relatively high mechanical strength.

7 Claims, 2 Drawing Figures

3,947,351

ACID DIFFUSION-DIALYSIS PROCESS UTILIZING ANION EXCHANGE MEMBRANE OF 4-55 MICRON THICKNESS

RELATIONSHIP TO PENDING APPLICATIONS

This application is a continuation-in-part of Ser. No. 211,940 filed Dec. 22, 1971, now abandoned entitled "Process for Preparing Acid Diffusion-Dialysis Membrane".

BACKGROUND OF THE INVENTION

1. Field Of The Invention

This invention relates to an acid diffusion-dialysis membrane which may be used for effectively separating and recovering an acid from a mixture of an acid and a salt, or a mixture of an acid and a water-soluble organic compound, e.g., glucose, by dialysis non-electrolytically, and to methods of producing such membranes. More particularly, this invention relates to an acid diffusion-dialysis membrane having a high acid diffusion-dialysis coefficient and a high acid-salt selectivity ratio which is high in chemical stability and high in mechanical strength.

2. Description Of The Prior Art

Diffusion-dialysis techniques have been used for separating acids, such as sulfuric acid, nitric acid, hydrochloric acid, phosphoric acid, hydrofluoric acid, or the organic acids, e.g., acetic acid, from mixtures of acids and salts, such as mixtures resulting from smelting and refining processes for nickel metal, solvent extraction, etching processes, pickling processes or plating processes. It is also known that diffusion-dialysis can be used for separating acids from mixtures of acids and organic compounds such as from a cellulose saccharification solution, a lactam solution from a Beckmann rearrangement process, mixtures of acids and glucose, and mixtures of acids and amino acids.

As disclosed in Japanese Pat. No. 299,433, anion-exchange membranes have often been used as dialysis membranes for such separation and recovery. However, in the usual acid dialysis process, using an anion exchange membrane, an electric current is used to cause a transfer of anions. If dialysis is to be effected by means other than electrodialysis, i.e., depending only on the concentration differences between the solution to be separated and the recovery solution, the membrane used should have a high acid diffusion-dialysis coefficient and a high acid-to-salt or acid-to-organic compound selectivity ratio, to be suitable for industrial application.

Usually, in order to increase the acid diffusion-dialysis coefficient, the thickness of the membrane must be decreased. The thickness of the conventional acid diffusion-dialysis membrane, however, must be maintained at between several tens of microns to about one hundred microns, since thinner membranes suffer from severe pin-hole formation, cracking, and low mechanical strength.

Moreover, although the thinner the membrane, the higher will be the diffusion-dialysis coefficient, it has also been found that the thinner th membrane, the lower will be the degree of selectivity for separating acid-salt or acid-organic compound mixtures. For example, one conventional diffusion-dialysis membrane prepared by coating a specific epoxy resin onto a reinforced fabric (U.S. Pat. No. 3,152,061), the relationship between acid diffusion-dialysis coefficient and thickness of membrane, and the relation between selectivity ratio for separating acid from salt and thickness of membrane are, respectively, shown in FIG. 1. In other words, in most conventional acid diffusion-dialysis membranes, as the thickness of the membrane decreases, the acid diffusion-dialysis coefficient increases, but the selectivity ratio significantly decreases.

It has been proposed to cross-link the membrane to a high degree in order to maintain a high selectivity ratio in thin membranes. However, as the density of cross-linkages increases, the acid diffusion-dialysis coefficient adversely decreases. It has been quite difficult, therefore, to increase both the acid diffusion-dialysis coefficient and the acid-salt or acid-organic compound selectivity ratio.

SUMMARY OF THE INVENTION

Accordingly, it is one object of this invention to provide a process for preparing a novel acid diffusion-dialysis membrane characterized by a high acid diffusion-dialysis coefficient and a high selectivity ratio for the separation and recovery of an acid from a mixture of an acid and a salt or an acid and an organic compound.

It is another object of this invention to provide a process for preparing a novel acid diffusion-dialysis membrane wherein the acid diffusion-dialysis coefficient of the membrane can be increased by decreasing the thickness of the membrane, whereby the decrease in acid selectivity is minimized.

It is another object of this invention to provide a relatively thin acid diffusion-dialysis membrane, having a high acid diffusion-dialysis coefficient and a high selectivity for the separation and recovery of an acid from a mixture of an acid and a salt or a mixture of an acid and an organic compound.

These and other objects and features of this invention can be attained by forming a film from (I) a vinyl group containing benzene monomer or a vinyl group containing pyridine monomer; (II) a non-conjugated divinyl monomer; and (III) a thermoplastic polymer which is swellable or soluble in the mixture of monomers (I) and (II), polymerizing said monomer mixture in the film, and then introducing anion exchange groups into the resulting polymerized product.

BRIEF DESCRIPTION OF THE DRAWINGS

The top portion of FIG. 1 is a graph of the variation of diffusion-dialysis coefficient $U_{H_2SO_4}$ as a function of acid diffusion-dialysis membrane thickness wherein the membrane used is prepared by conventional prior art techniques. The bottom portion of FIG. 1 is a graph of the variation of selectivity ratio for a mixture of $H_2SO_4$ and $ZnSO_4$, as a function of acid diffusion-dialysis membrane thickness wherein the membrane used is prepared by conventional prior art techniques.

The top portion of FIG. 2 is a graph of the variation of diffusion dialysis coefficient $U_{H_2SO_4}$ as a function of acid diffusion-dialysis membrane thickness wherein the membrane used is prepared by methods of the present invention. The bottom portion of FIG. 2 is a graph of the variation of selectivity ratio for a mixture of $H_2SO_4$ and $ZnSO_4$, as a function of acid diffusion dialysis membrane thickness wherein the membrane used is prepared by methods of the present invention.

DETAILED DESCRIPTION OF THE INVENTION

Figure 1:
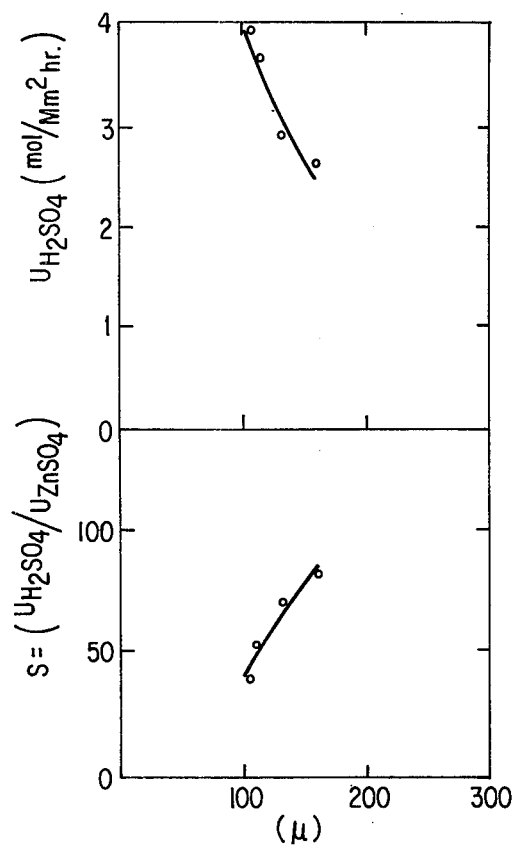
Figure 2:
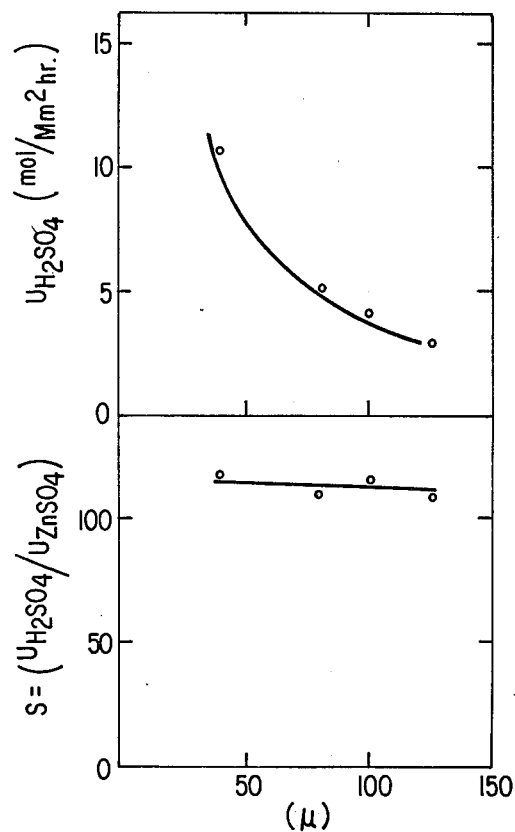

The top portion of FIG. 2 shows the relationship between the acid diffusion-dialysis coefficient and the membrane thickness of the membrane of this invention, and the bottom portion of that Figure shows the relationship between the acid-salt selectivity ratio (acid diffusion-dialysis coefficient/salt diffusion-dialysis coefficient) and the membrane thickness of the acid diffusion-dialysis membrane of this invention. It can be seen that the acid diffusion-dialysis coefficient increases as the thickness of the membrane decreases.

However, contrary to the prior art membranes, the acid-salt selectivity ratio of the membrane of this invention increases, as the thickness of the membrane decreases. Moreover, the membrane of this invention is characterized by a high mechanical strength and a dense structure, as can be homogeneously formed without the formation of pinholes and cracking difficulties experienced in the prior art. It is believed that these advantages are a result of the dense structure of the membranes of this invention and the high affinity between the thermoplastic material and the polymerization product of the monomers (I) and (II). Clearly, the matrix of the membranes of this invention is different than the fabric type matrix of conventional acid diffusion-dialysis membranes. The acid diffusion-dialysis membrane of this invention has an acid diffusion-dialysis coefficient of 2 – 10 times greater, and an acid-salt selectivity ratio of 2 – 10 times greater than the conventional membranes used for this purpose. Of course, this is a significant industrial advantage. For example, it is now possible to effectively separate and recover an acid from a mixture having a low concentration solution of the acid which previously would have been quite difficult to separate by the conventional diffusion-dialysis processes, which could thus solve many industrial pollution problems.

The vinyl group containing benzene monomer, or the vinyl group containing pyridine monomer (I) used for the preparation of the membrane should be a compound which can accept an ion exchange group introduced therein, such as a monomer of styrene, vinyltoluene, ethylvinylbenzene, ar-chloromethylstyrene, ar-bromomethylstyrene, vinyl-pyridine, or 2-methyl-5-vinyl-pyridine.

The non-conjugated divinyl compounds (II) should be capable of cross-linking the polymer formed by the polymerization of monomers (I), such as divinylbenzene, ethyleneglycol diacrylate or ethyleneglycol dimethacrylate. It is especially preferable to use a non-conjugated aromatic compound such as divinylbenzene, because of the chemical stability of the resulting membrane.

The characteristics of the resulting acid diffusion-dialysis membrane are dependent upon the composition of monomers (I) and (II). It is preferable to use 1 – 25 parts by weight, especially 3 – 20 parts by weight of the monomer (II) per 100 parts by weight of the monomer (I). The monomer mixtures (I) and (II) can be admixed, if desired, with a polymerization initiator, a photosensitizer, a plasticizer or other monomers. When thermal methods of polymerization are used, it is desirable to use a polymerization initiator. Suitable polymerization initiators which may be used for this purpose include benzoyl peroxide, $\alpha,\alpha'$-azobisisobutyro-nitrile,t-butylperbenzoate,t-butylperacetate,etc.

If photopolymerization is used, it is desirable to use a photosensitizer, such as benzoin, benzoin methylether, or $\alpha,\alpha'$-azobisisobutyronitrile. If radiation polymerization methods are used, polymerization can be conducted without an initiator. The quantity of polymerization initiator or photosensitizer when used may range in amounts of from 0.2 to 8 parts by weight per 100 parts by weight of the monomer (I). A plasticizer can be added to increase the affinity of the polymer produced from the monomer mixture, for the thermoplastic polymer, and is preferable a diester of phthalic acid, such as dibutyl phthalate, dioctylphthalate, etc. When a plasticizer is used, suitable effects are obtainable with amounts of 0–30 parts by weight per 100 parts by weight of the monomer (I). Other monomers may be included in the monomer mixture, which are copolymerizable with the monomers (I) and (II), such as acrylonitrile, methacrylonitrile, acrylic esters, methacrylic esters and ethylvinylbenzene.

The thermoplastic polymer (III) used herein should be soluble or at least swellable in the mixture of monomers (I) and (II), and should be acid-resistant. Preferably, its molecular weight (number average molecular weight) is greater than 10,000 and especially greater than 15,000. Suitable thermoplastic polymers include the homopolymers or copolymers of vinylchloride, ethylene, propylene, vinylidene chloride, and further includes polyphenylene oxide, styrene-butadiene rubber, butyl rubber, chlorinated butyl rubber, chlorosulfonated polyethylene, terpolymers of acrylonitrile-styrene-butadiene or the like.

In one method of preparing the film, the mixture of monomers (I) and (II) is impregnated into a film prepared from the thermoplastic polymer (III). That polymer film should have a thickness of 4 – 90 $\mu$ and preferably 5 – 55 $\mu$ and a sufficiently high density such that it has a void volume coefficient of less than 50%.

If the same type of diffusion-dialysis membrane is prepared using a fabric as in the prior art, instead of a film as in the present invention, the thickness of the membrane will be much greater and the acid diffusion-dialysis coefficient and the acid-salt selectivity ratio will each be too low. Accordingly, it is difficult to attain similar properties as the present membrane.

In order to impregnate the thermoplastic film with the monomer, the film is dipped into the monomer mixture, and is swollen. The degree of swelling can be controlled by the use of an appropiate diluent. Suitable diluents which may be used for this purpose include, preferably, aliphatic hydrocarbons, e.g., hexane, heptane, isooctane; aromatic hydrocarbons, e.g., benzene, toluene, xylene; alcohols, e.g., methanol, ethanol, isopropanol; ether, e.g., tetrahydrofuran, dioxane, ketones, e.g., acetone, methylethyl ketone; chlorinated hydrocarbons, e.g., tetrachlorohydrocarbon, trichloroethylene; gasolines; light oils and tetraline petroleum ether, etc.

The quantitiy of monomer mixture contained in the thermoplastic polymer film is important for the properties of the resulting acid diffusion-dialysis membrane. This quantity can be controlled by proper control of the viscosity of the monomer mixture. The viscosity should be selected between 20 – 500 cp. and preferably between 30 – 300 cp. The adjustment of the viscosity can be attained by adding another thermoplastic polymer to the monomer mixture. Suitable thermoplastic polymers which may be used for this purpose include styrene-butadiene rubber, butyl rubber, chlorinated polyethylene rubber, acrylonitrile-butadiene rubber, and chlorosulfonated polyethylene rubber, which are soluble in the monomer mixture. These thermoplastic polymeric materials can be conveniently added in a form of powder or granules.

Another method for preparing the film-form composition of the monomer mixture and the thermoplastic polymer is by admixing the thermoplastic polymer with the monomer mixture and then casting this mixture into the form of a film. The thermoplastic polymer used in this instance may also be in a powder or granular form. The viscosity of the mixture of the thermoplastic polymer and the monomer mixture is preferably 500 – 3,000 cp. and preferably 800 – 2000 cp; since it is used for film-forming. The viscosity may be adjusted by the addition of an appropriate diluent. A film can be cut from said mixture by various means; for example, by the casting method disclosed in J. M. McJelvey, *Polymer Processing*, P67 (1962). In this instance, the diluent should be selected so that it will evaporate at the film-forming temperatures. Evaporation of the monomers (I) and (II), of course, should be avoided. In casting, the thickness of the resulting film can be controlled by rotary motion to provide a thickness of from 4 to 90 $\mu$, and preferably from 5 to 55 $\mu$.

Regardless of the method for forming the film, the ratio of the thermoplastic polymer to the monomer mixture of (I) and (II) should be in the range of 100 to 600 parts/100 parts by weight, and especially 150 – 400 parts/100 parts by weight. The area of one side of the film should be at least 2 cm. × 2 cm.

The monomer components in the resulting film can be polymerized with the aid of heat, light, or ionizing irradiation, depending upon the type of additives (polymerization initiator, etc.) included in the monomer mixture.

If thermal polymerization is used, it is preferable to heat to 60° – 120°C. for 0.5 – 6 hours. If UV polymerization is used, it is preverable to subject to light irradiation of 3,600A wavelength, for 5 – 30 minutes. If ionizing radiation polymerization is used, it is preferable to irradiate with $\gamma$-rays from a $Co^{60}$ source, etc. for 5 – 30 minutes. Polymerization can be conducted under atmospheric pressure, high pressure or reduced pressure. In this procedure, the mixture of monomers (I) and (II) is polymerized to form a cross-linked polymer in the film. The resulting film is then treated to introduce anion exchange groups into the polymer. The method for introducing the anion exchange groups will be dependent upon the type of monomer (I) used. When styrene is used as the monomer (I), the resulting polymer of (I) and (II) in said film is haloalkylated with a haloalkyl ether, such as chloromethylether, in the presence of a Friedel-Crafts reaction catalyst, such as stannous chloride, zinc chloride, or aluminum chloride.

Haloalkylation is usually conducted by using 10 – 30 parts by weight of a Friedel-Crafts reaction catalyst per 100 parts by weight of haloalkyl ether, at 0° – 40°C. for 2– 10 hours. After the haloalkylation, the reaction product is washed with alcohol, e.g., methanol, and then is reacted with an amine, such as trimethylamine, dimethylethanolamine, or dimethylethylamine to introduce the ion exchange groups. The amination can be conducted by dipping the reaction product into the amine solution, diluted with water, methanol or ethanol, at 0° – 45°C. for 5 – 60 hours. When ar-halomethylstyrene is used as the monomer (I), the polymer in the film can be reacted with an amine in an amination process, without the haloalkylation process, since the haloalkyl groups are already contained in the polymer.

When vinylpyridine is used as the monomer (I), the resulting polymerized product is reacted with an alkylhalide, such as methyl iodide, or methyl bromide to quaternize it. The reaction is conducted at 0° – 40°C. for 4 – 30 hours by diluting the alkylhalide in a diluent, such as petroleum ether or carbon tetrachloride.

It is especially effective to use an ar-haloalkyl styrene, such as ar-chloromethylstyrene or ar-bromomethylstyrene, as the monomer (I), in order to prepare an acid diffusion-dialysis membrane having an especially high diffusion-dialysis coefficient and a high acid-salt or acid-organic compound selectivity ratio. The reason why this monomer produces such good results is not clearly understood. However, it is believed that when styrene is used as the monomer (I), it requires a haloalkylation process for introduction of the ion exchange group, but when this monomer is used, haloalkylation can be avoided. The haloalkylation reaction is rather slow, because it is difficult for the haloalkylation agent to penetrate the polymeric film. Accordingly, the haloalkylation is frequently difficult if not impossible to complete. On the other hand, when an ar-haloalkyl styrene is used as the monomer (I), the haloalkylation reaction can be avoided and only amination is required to introduce the ion exchange groups.

By the present techniques, therefore, it is possible to prepare an acid diffusion-dialysis membrane by the use of an ar-haloalkyl styrene, whereby a large number of ion exchange groups, effective for the acid diffusion-dialysis, can be introduced into the polymerized product. In this instance, the acid diffusion-dialysis coefficient, and the selectivity ratio will be quite high. The resulting acid diffusion-dialysis membrane has a thickness of 4 – 100$\mu$ and the characteristics which has an acid diffusion-dialysis coefficient $U_{H_2SO_4}$ = 4 – 17 mol./Mn$^2$hr. and a selectivity ratio of acid to salt of more than 60%. When the thickness of membrane is in a range of 5 – 55$\mu$, it is to provide the acid diffusion-dialysis membrane having superior acid diffusion-dialysis coefficient and selectivity ratio of acid to salt. The conventional thin acid diffusion-dialysis can not impart such properties.

The membrane of this invention may be used for separating any organic or inorganic protonic acids having MW of less than 300, preferably less than 200. Suitable such acids include sulfuric acid, nitric acid, hydrochloric acid, phosphoric acid, hydrofluoric acid, or such organic acids as acetic acid. Separation can be made from mixtures of acids and salts, such as acid salts or organo amino salts. Such mixtures may result from smelting and refining processes for nickel metal, solvent extraction, etching processes, pickling processes or plating processes. The mixture may contain organic compounds which do not swell the membrane such as cellulose saccharification solution, lactam solution from Beckmann rearrangement, glucose, amino acids, or saccharoses.

The acid concentration in the mixture may be from 0.001 molar % to saturated solutions and preferably 1 – 10 molar %.

Temperature of separation may range from 0° – 70°C and preferably 5° – 50°C.

The linear velocity of the fluid may be less than 50 cm/sec, preferably 1 – 5 cm/sec and the linear velocity of the water may be from 0.1 – 5.0 times the linear.

Having generally described the invention, a further understanding can be attained by reference to certain specific Examples which are provided herein for purposes of illustration only and are not intended to be limiting in any manner unless otherwise specified.

In the Examples, the acid diffusion-dialysis coefficient and the salt diffusion-dialysis coefficient of the acid diffusion-dialysis membrane (for example $U_{H_2SO_4}$, $U_{ZnSO_4}$, etc.) were measured as follows:

30 cc. of a mixture of 1 M (mole per liter) of acid and 1 M (mole/l) of salt was dialyzed through a diffusion-dialysis membrane of 2 cm × 5 cm of surface area, to 30 cc. of water at 26°C. for 20 minutes, and the amounts of the acid and the salt diffused to the water phase were measured, respectively.

The diffusion-dialysis coefficient was shown in U (number of moles of solute diffused per unit time per unit area of membrane per concentration difference).

$U$ = moles/m² hr. $\Delta M$ $\Delta M$ indicate concentration difference

The selectivity ratio is shown as:

$S = U$ acid/$U$ salt

Reference

An acid diffusion-dialysis membrane was prepared in accordance with the process of U.S. Pat. No. 3,152,061. 200 parts by weight of dichloromethane solution containing 50 wt. % of condensation product of bisphenol A and epichlorohydrine (epoxide equivalent of about 220), and 84 parts of acetone solution containing 50 wt.% of m-phenylenediamine, and 45 parts of a mixture of triethylene-tetramine and tetraethylpenthinine of 1 : 1 were admixed to yield a solution. A woven fabric of polyethylene-terephthalate having a thickness of 100 $\mu$ was dipped into said solution, removed therefrom, and air-dried. The impregnated fabric was then heated at 140° – 150°C. for 7 minutes to cure the epoxy resin. The cured membrane was dipped into a 30% formalin solution acidified with hydrochloric acid and was washed with 0.5% sodium sulfate solution to yield an acid diffusion-dialysis membrane.

The thickness of the membrane was 113 $\mu$. The sulfuric acid diffusion-dialysis coefficient was $U_{H_2SO_4}$ = 3.64.

The zinc sulfate diffusion-dialysis coefficient was $U_{ZnSO_4}$ = 0.073.

The selectivity ratio was $S = U_{H_2SO_4}/ U_{ZnSO_4}$ = 50.

EXAMPLE 1

A film having a thickness of 30 $\mu$ and an area of 5 cm × 5 cm formed from polyvinylchloride having a molecular weight of 72,000 (containing 40 parts of dioctylphthalate to 100 parts of said polyvinylchloride) was dipped into a monomer mixture containing 92.5 parts of styrene, 5 parts of divinylbenzene, 2.5 parts of ethylvinylbenzene, 2 parts of benzoyl peroxide and 100 parts of isooctane, at room temperature for 1 hour.

The film containing said monomer mixture was inserted between two sheets of polyethylene terephthalate which in turn was inserted between two sheets of glass plates. The composite was compressed and maintained at 85°C. for 4 hours to polymerize the monomer mixture.

The resulting film was contacted with chloromethyl ether in the presence of stannous tetrachloride at room temperature for 6 hours. The resulting film was washed with water and was dipped in a 15% methanol solution of trimethylamine for 40 hours for amination. The resulting acid diffusion-dialysis membrane was flexible and had a thickness of 55 $\mu$ and the acid diffusion-dialysis coefficient was: $U_{H_2SO_4}$ = 6.0; the salt diffusion-dialysis coefficient was: $U_{ZnSO_4}$ = 0.07; and the selectivity ratio was $S$ = 86.

EXAMPLE 2

The process of Example 1 was repeated using a monomer mixture containing 92.5 parts of a$\gamma$-chloromethylstyrene, 5 parts of divinylbenzene, 2.5 parts of ethylvinylbenzene, 5 parts of polystyrene-butadiene rubber (26% styrene content), 4 parts of benzoylperoxide and 150 parts of isooctane. The resulting acid diffusion-dialysis membrane was flexible and had a thickness of 53 $\mu$ and an acid diffusion-dialysis coefficient $U_{H_2SO_4}$ = 8.2; Salt diffusion-dialysis coefficient $U_{ZnSO_4}$ = 0.072, and the selectivity ratio = 114.

EXAMPLE 3

A film having a thickness of 30 $\mu$ and a width of 90 cm. and length of 30 cm. made of polyvinylchloride as in Example 1 was continuously dipped into the monomer mixture of Example 2 in a bat (100 × 20 × 50 cm). After dipping, the resulting film formed compound was continuously taken up with polyvinylalcohol film on a roller under tension perpendicular to the running direction and the film was covered with polyvinylchloride tape. The roll of film was maintained at 95°C. for 4 hours to polymerize the monomer mixture impregnated in the polyvinylchloride film and the polymerized film was removed and dipped into a 6.5% methanol solution of trimethylamine for amination.

The resulting acid diffusion-dialysis membrane was flexible and had a thickness of 42 $\mu$ and an acid diffusion-dialysis coefficient $U_{H_2SO_4}$ = 11.2, salt diffusion-dialysis coefficient $U_{ZnSO_4}$ = 0.096, and selectivity ratio $S$ = 117.

Other acid diffusion-dialysis membranes were prepared, in accordance with this process, except that the thickness of the film was varied. $U_{H_2SO_4}/U_{ZnSO_2}$ of each product was measured and is shown in FIG. 2.

As is clear in FIG. 2, the value of $U_{H_2SO_4}$ of the acid diffusion-dialysis membrane of this invention is significantly increased as the thickness of film is decreased, while the value of $S = U_{H_2SO_4}/U_{ZnSO_4}$ is also surprisingly increased as the thickness of the film is decreased.

EXAMPLE 4

An acid diffusion-dialysis membrane was prepared in accordance with the process of Example 2, except that a film having an area of 5 cm × 5 cm and a thickness of 10 $\mu$ made of copolyvinylidenechloride -10% vinylchloride, molecular weight 80,000 was used. The resulting acid diffusion-dialysis membrane had a thickness of 19 $\mu$, and an acid diffusion-dialysis coefficient $U_{H_2SO_4}$ = 3.9; salt diffusion-dialysis coefficient $U_{ZnSO_4}$ = 0.011 and selectivity ratio $S$ = 355.

EXAMPLE 5

An acid diffusion-dialysis membrane was prepared in accordance with the process of Example 2, except using a monomer mixture of 85 parts of ar-chloromethylstyrene, 10 parts of divinylbenzene, and 5 parts of ethylvinylbenzene. The resulting acid diffusion-dialysis membrane had a thickness of 55 $\mu$ and an acid diffusion-dialysis coefficient $U_{H_2SO_4}$ = 5.12; salt diffusion-dialysis coefficient $U_{ZnSO_4}$ = 0.011 and selectivity ratio $S$=466.

EXAMPLE 6

10 parts of polyvinylchloride fine powder (MW 72,000, 50 mesh) was dissolved in 100 parts of tetrahydrofuran. A float glass plate was dipped into said solution and was taken up at the velocity of 2 cm./sec. It was then dried at 80°C. and heated at 120°C. to yield a film having a thickness of 2.5 $\mu$ and an area of 5 cm × 5 cm made of polyvinylchloride. An acid diffusion-dialysis membrane was prepared in accordance with the process of Example 4, except using the resulting film. The resulting acid diffusion-dialysis membrane had a thickness of 4.0 $\mu$ and an acid diffusion-dialysis coefficient $U_{H_2SO_4} = 16.5$; salt diffusion-dialysis coefficient $U_{ZnSO_4} = 0.26$; and selectivity ratio S= 64.

EXAMPLE 7

A film having a thickness of 30 $\mu$ and an area of 5 cm × 5 cm made of polyethylene (prepared by low pressure method; melt index 2.0; specific gravity 0.95) was dipped into a monomer mixture of 92.5 parts of a $\gamma$-chloromethylstyrene, 5 parts of divinylbenzene, 2.5 parts of ethylvinylbenzene, 5 parts of polystyrene-butadiene rubber (styrene content 26%) and 4 parts of benzoyl peroxide, at 50°C. for 1 hour. An acid diffusion-dialysis membrane was prepared in accordance with Example 2, by using this film. The resulting acid diffusion-dialysis membrane had a thickness of 40 $\mu$, and an acid diffusion-dialysis coefficient $U_{H_2SO_4} = 6.4$; salt diffusion-dialysis coefficient $U_{ZnSO_4} = 0.0051$; and selectivity ratio S = 125.

EXAMPLE 8

A polyvinylchloride film having a thickness of 30 $\mu$ was dipped into a monomer mixture of 92.5 parts of 2-methyl-5-vinyl-pyridine, 5 parts of divinylbenzene, 2.5 parts of ethylvinylbenzene, 5 parts of polyacrylonitrile-butadiene rubber, 3 parts of benzoyl peroxide and 180 parts of isooctane at room temperature for 30 minutes and then was inserted between two sheets of polyethyleneterephthalate. This composite was then inserted between two sheets of glass and was pressed at all four corners, and heated at 85°C. for 4 hours to polymerize the monomer mixture. The resulting film was reacted with a 20% petroleum ether solution of methyliodide to quarternize it. The resulting acid diffusion-dialysis membrane had a thickness of 50 $\mu$ and an acid diffusion-dialysis coefficient $U_{H_2SO_4} = 9.0$; salt diffusion-dialysis coefficient $U_{ZnSO_4} = 0.091$ and selectivity ratio S = 99.

EXAMPLE 9

100 parts of polyvinylchloride (100 mesh MW 60,000), 350 parts of tetrahydrofuran, 46.2 parts of ar-chloromethylstyrene, 1.3 parts of divinylbenzene and 3 parts of benzoyl peroxide were admixed to prepare a mixture solution. The mixture solution was cast onto a drum of a drum type film forming apparatus and then tetrahydrofuran was evaporated to yield a film product having a width of 0.9 m. and a thickness of 30 $\mu$. The film was taken up with polyvinylalcohol film under tension perpendicular to the running direction of a roller having a diameter of 20 cm. The film was covered with polyvinylchloride tape and was heated at 90°C. for 3 hours to polymerize the monomer mixture. The film of polymerized product was reacted with a 6.5 % methanol solution of trimethylamine for 20 hours for amination.

The resulting acid diffusion-dialysis membrane was flexible and had a thickness of 45$\mu$ and an acid diffusion-dialysis coefficient $U_{H_2SO_4} = 9.5$; salt diffusion-dialysis coefficient $U_{ZnSO_4} = 0.092$; and selectivity ratio S = 103.

EXAMPLE 10

An acid diffusion-dialysis apparatus having two cells each having a volume of 30 cc. and using the acid diffusion-dialysis membrane of Example 2 (membrane area 2 cm × 2 cm) was used for dialyzing a solution of 1 M (mole/l) of sulfuric acid and 1 M (Mole/l) of nickel sulfate, against distilled water at 25°C. for 20 minutes. The following result was found:

$$U_{H_2SO_4} = 11.0;\ U_{NiSO_4} = 0.096;\ S = 114$$

EXAMPLE 11

30 cc. of a solution of 1 M (mole/l) of sulfuric acid and 0.5 M (Mole/l) of FeSO$_4$ was dialyzed, against 30 cc. of distilled water at 25°C. for 20 minutes by using the acid diffusion-dialysis cell of Example 10. The following results were found:

$$U_{H_2SO_4} = 10.5;\ U_{FeSO_4} = 0.098;\ S = 107$$

EXAMPLE 12

A solution of 1 mole of sulfuric acid and 0.5 mole of glucose was dialyzed against distilled water at 25°C. for 1 hour, by using the acid diffusion-dialysis cell of Example 10. The following results were found:

$$U_{H_2SO_4} = 10.1;\ U_{glucose} = 0.103;\ S = 99$$

Having now generally described the invention, it will be apparent to one of ordinary skill in the art that many changes and modifications can be made thereto without departing from the spirit or scope of the invention.

Accordingly, what is claimed as new and intended to be covered by letters patent is:

1. In a process for effecting diffusion-dialysis of acids, the improvement which comprises:
    using a membrane 4 – 55$\mu$ thick prepared by polymerizing a monomer mixture of 100 parts by weight of $\gamma$-chloromethylstyrene and 3 – 20 parts by weight of divinylbenzene in contact with 150 – 400 parts by weight of a thermoplastic polymer, having a molecular weight of greater than 10,000 and being selected from the group consisting of polyvinylchloride, polyvinylidene chloride, polyethylene and polypropylene, and then is reacted with trimethylamine for amination.

2. The process of claim 1, wherein said thermoplastic polymer is dipped into said monomer mixture which in addition to said divinylbenzene and $\gamma$-chloromethylstyrene contains 50 – 300 parts by weight of a diluent selected from the group consisting of isooctane, petroleum ether and gasoline.

3. The process according to claim 1, wherein the thermoplastic polymer is in the form of a film and contact between said film and said monomer mixture is effected by impregnating the monomer mixture into said film.

4. The process according to claim 1, wherein the thermoplastic polymer is in the form of a powder or granule and is admixed with said monomer mixture and is formed into a film prior to polymerization.

5. The process according to claim 1, wherein said monomer mixture further contains a polymerization initiator and thermal polymerization is effected by thermal polymerization techniques.

6. The process according to claim 1, wherein said monomer mixture further contains a photosensitizer and polymerization is effected by photo-polymerization techniques.

7. The process according to claim 1, wherein said monomer mixture is polymerized by ionizing radiation polymerization techniques.

* * * * *